United States Patent [19]

Beckman

[11] 4,341,343

[45] Jul. 27, 1982

[54] MAGNETICALLY DRIVEN CENTRIFUGE SYSTEM

[76] Inventor: Stuart Beckman, 531 Kingsland St., Nutley, N.J. 07110

[21] Appl. No.: 189,158

[22] Filed: Sep. 22, 1980

[51] Int. Cl.$^3$ .................................................. B01D 1/00

[52] U.S. Cl. ........................................ 233/26; 366/214

[58] Field of Search .......................... 233/23 R, 24, 26; 366/214, 235, 273, 274; 422/72

[56] References Cited

U.S. PATENT DOCUMENTS 2,844,363 7/1958 Clark ............................... 366/273 X 3,304,990 2/1967 Ontko ............................... 233/26 X 4,226,669 10/1980 Vilardi ............................. 233/26 X

*Primary Examiner*—Billy J. Wilhite

*Attorney, Agent, or Firm*—Anthony F. Cuoco

[57] ABSTRACT

A magnetically driven centrifuge system includes a centrifuge (2) carrying specimen tubes (10) extending radially therefrom and supporting a magnetic member (25). The centrifuge is arranged with a base (18) of the type having a rotating magnet, whereby the centrifuge (2) spins freely on the base (18) by virtue of the magnetic interaction between the rotating magnet and the magnetic member (25).

16 Claims, 8 Drawing Figures

MAGNETICALLY DRIVEN CENTRIFUGE SYSTEM

BACKGROUND OF THE INVENTION

This invention relates to centrifuges used for separating particulate matter from a liquid suspension as, for example, for separating substances from biological fluids prior to microscopic examination. More particularly, this invention relates to a system including a centrifuge of the type which is magnetically driven and does not require a rotating shaft as is necessary in centrifuges for like purposes now known in the art.

Laboratories, particularly those in medical facilities in schools, clinics, doctor's offices and the like require centrifuges for separating substances from biological media for microscopic examination. Ideally, these devices should be adaptable to various environments; be small, lightweight and portable; be relatively maintenance free; and be explosion-proof. The present invention combines these advantages and, additionally, is simple in construction since it does not require a shaft for drive or support purposes.

SUMMARY OF THE INVENTION

This invention contemplates a system including a magnetically driven centrifuge having a chamber with an open top and a closed bottom. A magnet member is disposed within the chamber and slots are formed around the periphery of the open top for receiving specimen tubes or vials. The tubes are retained in the slots and extend radially therefrom when a cap engages the open top. The closed bottom of the chamber has a pivot for supporting the centrifuge on a magnetic base, whereby the centrifuge spins freely on the base through the magnetic interaction between the magnetic base and the magnetic member disposed within the centrifuge chamber, thereby eliminating the need of a driving or supporting shaft as would otherwise be required.

DETAILED DESCRIPTION OF THE INVENTION

Figure 1:
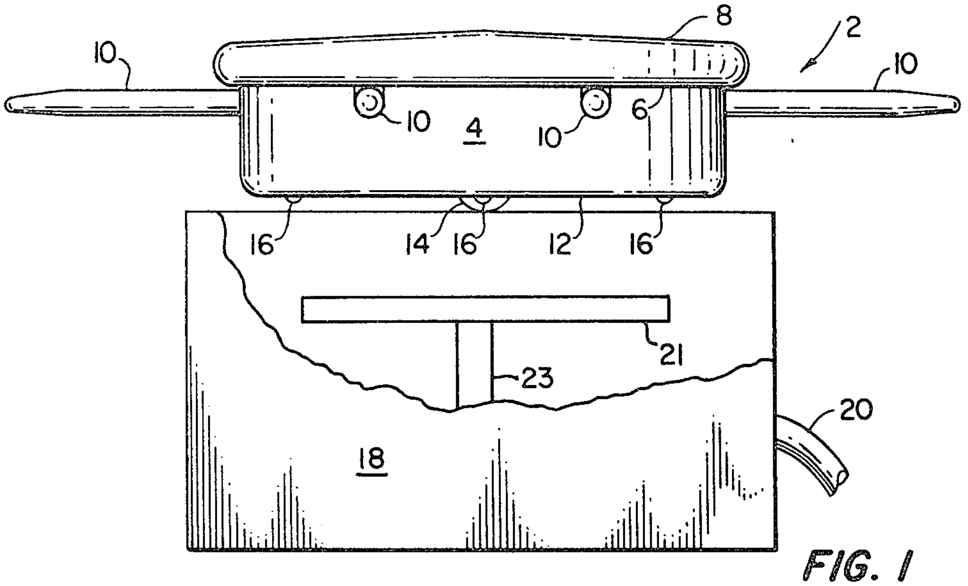
FIG. 1 is a diagrammatic representation of the centrifuge system of the invention showing a centrifuge disposed on a magnetic base for spinning freely thereon in accordance with the invention.

With reference first to FIG. 1, the system of the invention includes a centrifuge designated by the numeral 2 and having a chamber 4 with an open top 6 closed by a removable cap 8. Removable specimen tubes or vials 10 extend radially from chamber 4. Closed bottom 12 of chamber 4 has a supporting pivot 14 and stabilizing means, shown for illustrative purposes as a plurality of nodes 16, extending externally therefrom.

Centrifuge 2 is supported by pivot 14 on a base 18. Base 18 may be, for example, a conventional magnetic, variable speed laboratory stirrer of the type marketed by Techni-Lab Instruments, Pequannock, New Jersey, under their trade designation TLI Model 126, and which includes a magnet 21 secured to a shaft 23 which is driven by a power source connected to the stirrer through a cable 20. In this connection it will be understood that the power source (not otherwise shown) may be of the electrical, pneumatic or hydraulic type to serve the described purpose, as will now be understood by those skilled in the art.

Centrifuge 2 includes a magnetic member as will be hereinafter described. A magnetic field is thereby created with the rotating magnet of base 18, whereby the centrifuge spins freely about its axis to impart an appropriate centrifugal force to the substances in specimen tubes 10.

Figure 5:
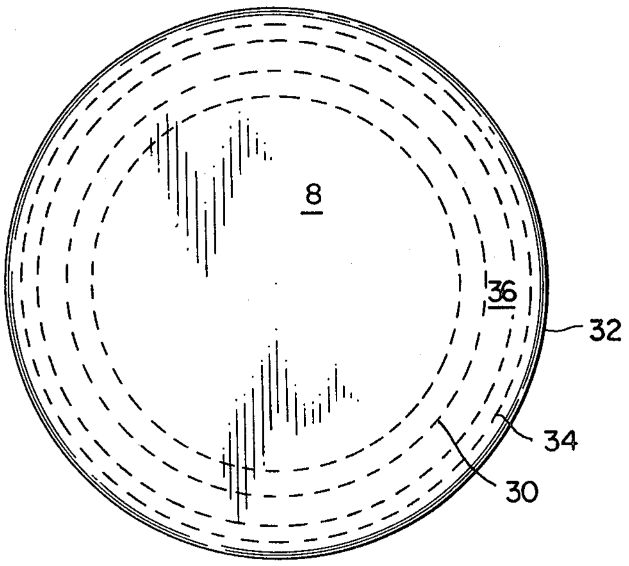
FIG. 5 is a top view of the cap for closing the open chamber top.
Figures 6, 7, 8:
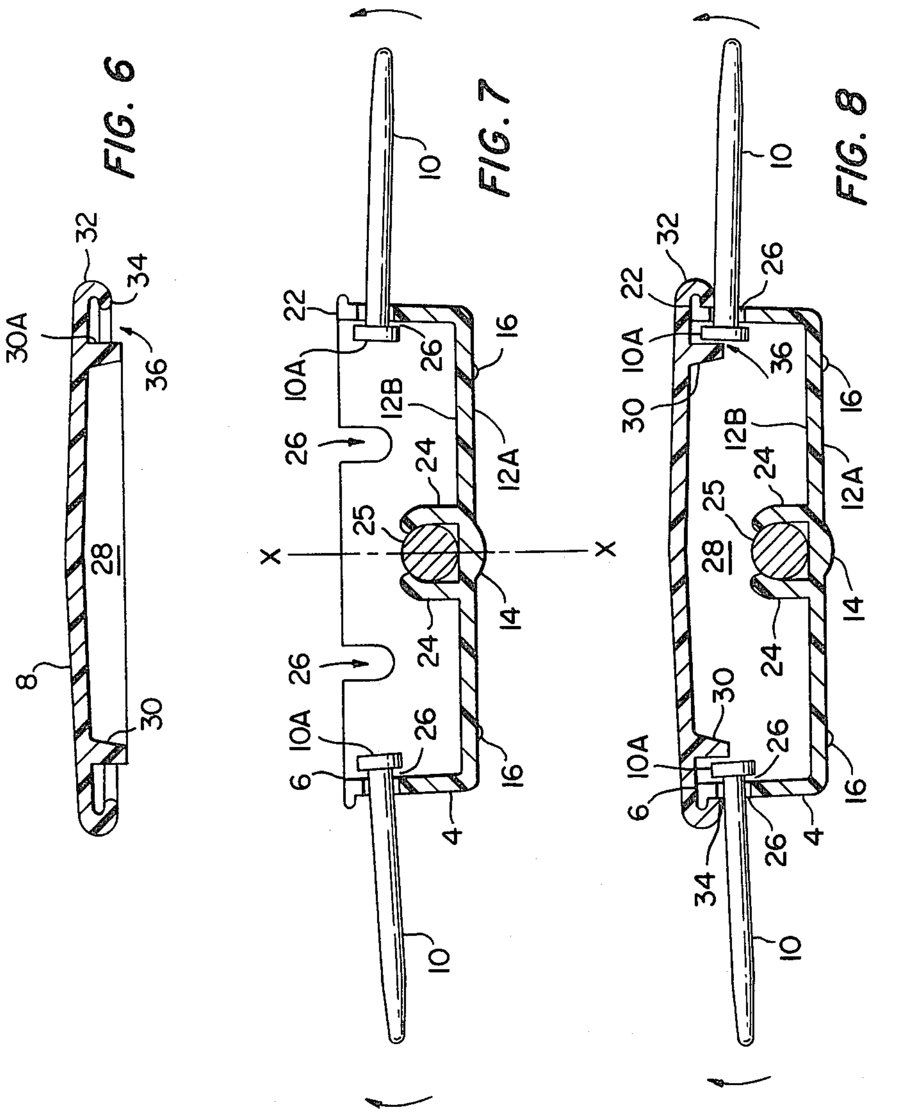
FIG. 6 is a sectioned front view of the cap.
FIG. 7 is a sectioned front view of the centrifuge chamber showing the specimen tubes received in the slots therein.
FIG. 8 is a sectioned front view of the centrifuge assembly according to the invention.

Centrifuge chamber 4 is shown in substantial detail in FIGS. 2, 3, 4 and 7, while centrifuge cap 8 is likewise shown in FIGS. 5 and 6. Centrifuge 2 is shown in substantial detail in FIG. 8.

With reference now to FIGS. 2, 3, 4 and 7, chamber 4 is a substantially cup-shaped member preferably molded of a suitable thermoset resin or polymer type plastic such as, for example, polypropylene so as to be relatively resilient. Chamber 4 has a flange 22 extending circumferentially around open top 6. Closed bottom 12 carries on its external surface 12A axially disposed supporting pivot 14 and radially disposed equally spaced stabilizing nodes 16. In order to provide the appropriate stabilizing action to the centrifuge, nodes 16 should be of equal length and terminate slightly above support-pivot 14.

Figure 2:
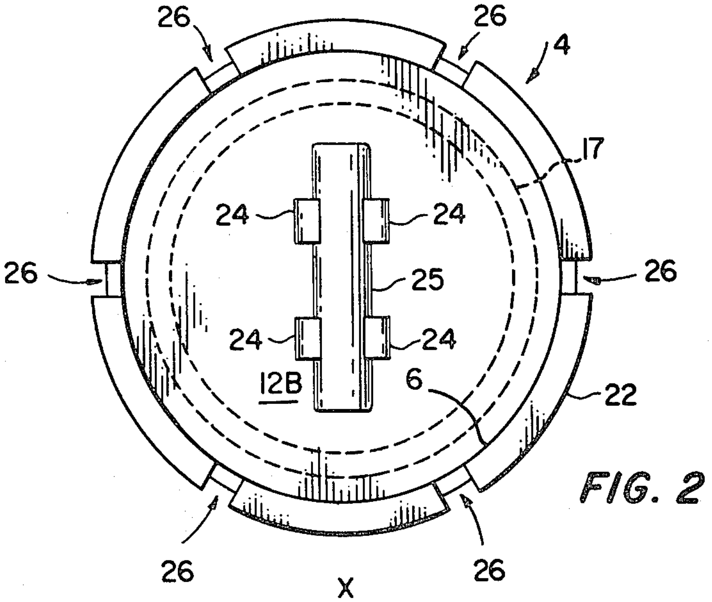
FIG. 2 is a diagrammatic top view of the centrifuge chamber according to the invention.
Figure 3:
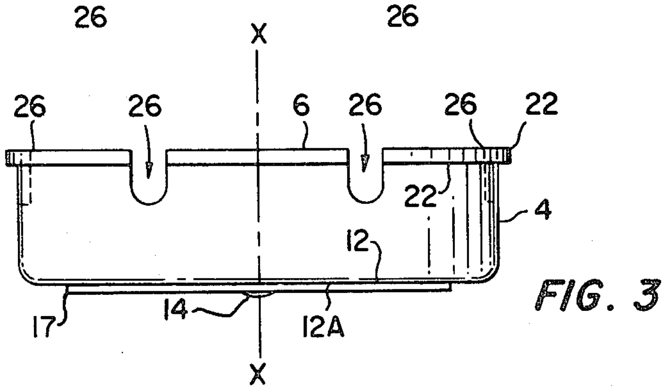
FIG. 3 is a diagrammatic side view of the centrifuge chamber.
Figure 4:
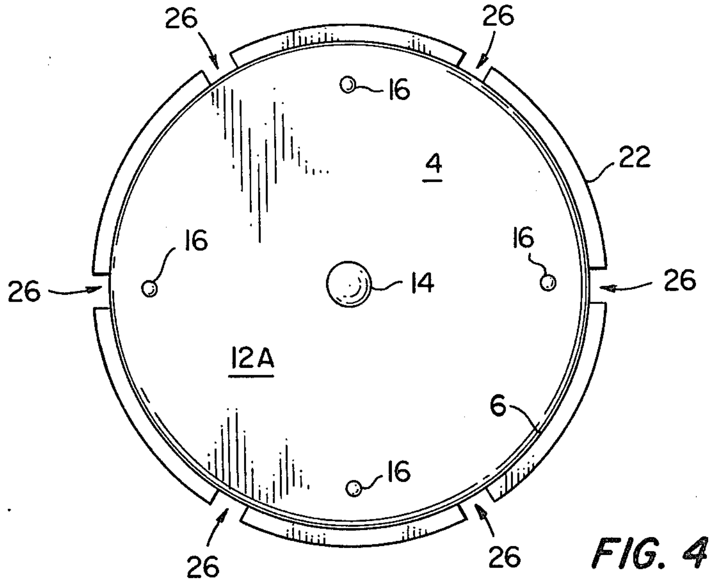
FIG. 4 is a diagrammatic bottom view of the centrifuge chamber.

In this connection it is noted that nodes 16, while shown as four in number, may be more or less than four or the stabilizing means may be a continuous ring 17 on external surface 12A of bottom 12 as best shown in FIGS. 2 and 3 to satisfy the purposes of the invention as will hereinafter become evident.

Closed bottom 12 carries lugs 24 on its internal surface 12B for removably supporting a magnetic member 25. Magnetic member 25 may be, for purposes of illustration, a Teflon coated magnet of the type used for laboratory purposes such as marketed by Bel-Art Products Inc., Pequannock, New Jersey, under their registered trademark SPINBAR. Magnetic member 25 snaps over lugs 24 so as to be held in position thereby on internal surface 12B of closed bottom 12 of chamber 4, and is hence removable and replaceable as may be desired.

Flange 22 of chamber 4 has a plurality of equally spaced slots 26 extending circumferentially therearound. Slots 26, shown, for example, as six in number receive specimen tubes 10 as will next be described in substantial detail.

With specific reference now to FIG. 7, slots 26 are sized so as to receive tubes 10 with clearance. The tubes have stopper ends 10A which receive closure members and which stopper ends extend beyond the slots as shown in the Figure. When the centrifuge is unenergized, tubes 10 drop slightly from a position normal to axis X—X of chamber 4. Upon energization and generation of the appropriate centifugal force, the tubes are displaced in the direction of the arrows and assume a position substantially normal to the chamber axis as will be evident to those skilled in the art and as best shown in FIG. 1.

With reference now to FIGS. 5 and 6, cap 8, which is also preferably molded of a resilient material such as described with reference to chamber 4, has a hollow portion 28 defined by a sidewall 30. A lip 32 having a hooked flange 34 extends beyond the sidewall so that a space 36 is created between the hooked flange and the outer surface 30A of the sidewall.

As shown in FIG. 8, with tubes 10 in slots 26, cap 8 is snapped over chamber 4. Hooked flange 34 of cap lip 32 engages chamber flange 22 so as to be retained in place. Tube stopper ends 10A are received in space 36 so that the tubes are loosely captured in chamber 4. When the centrifuge is unenergized, stopper ends 10A clear side wall 30 and the sides of chamber 4. Upon energization, and the generation of appropriate centrifugal force as heretofore noted, the stopper ends may become adjacent outer surface 30A of sidewall 30 as tubes 10 assume a position substantially normal to axis X—X.

Although the invention has been described with reference to chamber 4 and cap 8 both preferbly being of a substantially resilient material, actually only one of said members (preferably the cap) need be of such a material while the other member (preferably the chamber) may be of a relatively rigid non-ferrous material, with the aforenoted snapping action between the cap and chamber occurring as described above to accomplish the required purpose.

In operating the invention as described with reference to the drawings, tubes 10 are filled with specimen solutions and closed at stopper ends 10A. The filled and closed tubes are loaded into slots 26 of chamber 4 and cap 8 is snapped over the open end of the chamber, whereby the tubes are retained in the centrifuge. In this regard it is noted that empty tubes 10, i.e. tubes without specimen solutions, should be loaded to fill the centrifuge for balancing purposes as will now be understood. If required, balancing may be achieved by filling the otherwise empty tubes with water.

The loaded centrifuge is placed on base 18. Prior to energizing the base, chamber 4 will be tilted so as to rest on one side or the other on the stabilizing means shown as nodes 16. Tubes 10 will drop toward base 18, away from a position normal to axis X—X, as shown in the drawings.

Base 18 is energized so that the rotating speed of the base magnet is gradually increased, whereby a magnetic interaction with magnetic member 25 takes place to rotate centrifuge 2 and to generate a centrifugal force. Upon generation of an adequate centrifugal force, centrifuge 2 raises from its tilted position so as to be supported on supporting pivot 14 and to spin freely about axis X—X.

Tubes 10 are now displaced in the direction of the arrows (FIGS. 7 and 8) so as to be substantially normal to axis X—X, with the centrifuging of the specimen solutions in tubes 10 thereupon taking place.

After the centrifuging action has taken place for an appropriate time (three minutes, for example) at an appropriate speed (2000 RPM, for example) the rotating speed of the base magnet and hence the rotating speed of the centrifuge is gradually reduced. In this regard, stabilizing nodes 16 insure that as the centrifuge comes to rest it gently tilts to one side or the other so as to rest on the stabilizing nodes to avoid resuspension of the centrifuged sediment.

When the centrifuge comes to rest, cap 8 is removed from chamber 4 and tubes 10 are removed from slots 26, with the tubes being thereupon placed vertically on a rack or the like for examination or analysis of the centrifuged contents therein as may be required.

What is claimed is:

1. A magnetically driven centrifuge system, comprising:
- a chamber having an open top and a closed bottom, with an axially disposed supporting pivot extending externally from the closed bottom;
- a magnetic member;
- the chamber including means for supporting the magnetic member therein;
- a flange extending circumferentially around the open top;
- a plurality of slots equally spaced around the flange;
- a plurality of tubes containing specimens carried within corresponding slots so as to extend radially from the chamber and external thereto;
- a cap which engages the chamber flange for closing the open top and including means cooperating with the flange for retaining the specimen tubes in the slots;
- a base for supporting the chamber, said base having a rotatable magnet; and
- the closed chamber spinning freely on the supporting pivot about the chamber axis upon rotation of the base magnet by virtue of the centrifugal force created by the magnetic interaction between the rotating magnet and the magnetic member supported within the chamber, whereby a centrifuging action is imparted to the specimens in the tubes.

2. A magnetically driven centrifuge system as described by claim 1, including:
- stabilizing means extending externally from the closed bottom for stabilizing the closed chamber when the centrifugal force is insufficient to cause the chamber to spin freely on the supporting pivot about its axis.

3. A magnetically driven centrifuge system as described by claim 2, wherein:
- the stabilizing means includes a plurality of radially disposed equally spaced nodes; and
- each of the plurality of nodes extends on equal distance from the closed bottom and terminates above the supporting pivot.

4. A magnetically driven centrifuge system as described by claim 2, wherein:
- the stabilizing means includes a continuous ring extending from the closed bottom.

5. A magnetically driven centrifuge system as described by claim 1, wherein:
- at least the cap is of a relatively resilient material; and
- the cap engages the chamber flange by snapping over said flange.

6. A magnetically driven centrifuge system as described by claim 5, wherein:
- the cap has a lip with a hooked flange; and
- the hooked flange engages the chamber flange when the cap is snapped over said flange.

7. A magnetically driven centrifuge system as described by claim 6, wherein:
- the cap has a sidewall internal thereto;

the hooked flange extends beyond the edge of the sidewall to define therewith a space within the cap; and the specimen tubes are carried within the slots so that the ends of the tubes are disposed within the space when the hooked flange engages the chamber flange.

8. A magnetically driven centrifuge system as described by claim 7, wherein:

the ends of the tubes carried within the slots extend beyond the slots so that the tubes are retained within the slots when the ends are disposed within the space.

9. A magnetically driven centrifuge system as described by claim 8, wherein:

the slots and space are sized so that the tubes are loosely retained within the slots and the ends thereof loosely disposed within the space, and the tubes drop away from the normal to the axis of the chamber toward the base when the centrifugal force is insufficient to impart the centrifuging action; and the tubes are displaced to extend substantially normal to the axis of the chamber when the centrifugal force is sufficient to impart the centrifuging action.

10. A magnetically driven centrifuge system as described by claim 1, wherein:

the specimen tubes are carried within the slots so as to be removable therefrom when the cap is disengaged from the chamber flange and the chamber top is open.

11. A magnetically driven centrifuge system as described by claim 1, wherein:

at least the chamber is of a relatively resilient material and the means for supporting the magnetic member therein includes a first pair of lugs in spaced relation and a second pair of lugs in like spaced relation, the first and second pairs of lugs being spaced apart from each other and extending internally from the closed bottom symmetrically about the center thereof; and the magnetic member is snapped between the first and second pairs of lugs so as to be removably supported thereby within the chamber.

12. A magnetically driven centrifuge system as described by claim 1, wherein:

the specimen tubes are carried within the slots so as to be in radial opposition to each other.

13. A magnetically driven centrifuge system, comprising:

a chamber having an axially disposed supporting pivot extending externally from the bottom thereof;

a magnetic member supported within the chamber;

the chamber including means for carrying a plurality of tubes containing specimens disposed radially around the chamber and extending external thereto;

a base for supporting the chamber, said base having a rotatable magnet; and the chamber spinning freely on the supporting pivot about the chamber axis upon rotation of the base magnet by virtue of the centrifugal force created by the magnetic interaction between the rotating magnet and the magnetic member supported within the chamber, whereby a centrifuging action is imparted to the specimens in the tubes.

14. A magnetically driven centrifuge system as described by claim 13, including:

stabilizing means extending externally from the chamber bottom for stabilizing the closed chamber when the centrifugal force is insufficient to cause the chamber to spin freely on the supporting pivot.

15. A magnetically driven centrifuge system as described by claim 14, wherein:

the stabilizing means includes a plurality of radially disposed equally spaced nodes; and each of the plurality of nodes extends an equal distance from the chamber bottom and terminates above the supporting pivot.

16. A magnetically driven centrifuge system as described by claim 14, wherein:

the stabilizing means includes a continuous ring extending from the chamber bottom.

* * * * *